J. E. CONNER.
OUTDOOR RUG.
APPLICATION FILED MAR. 24, 1917.
1,237,243.
Patented Aug. 14, 1917.
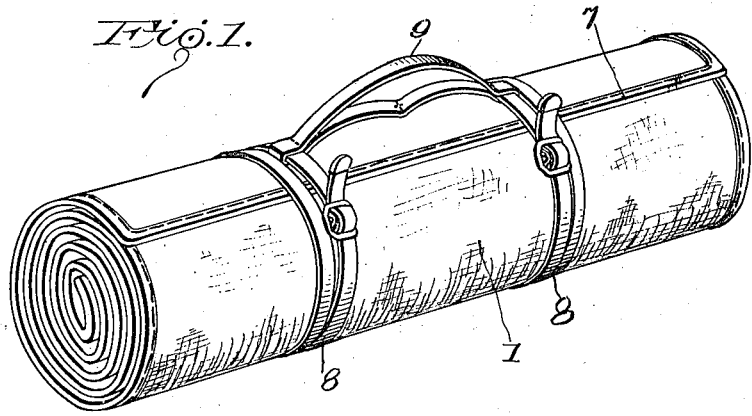
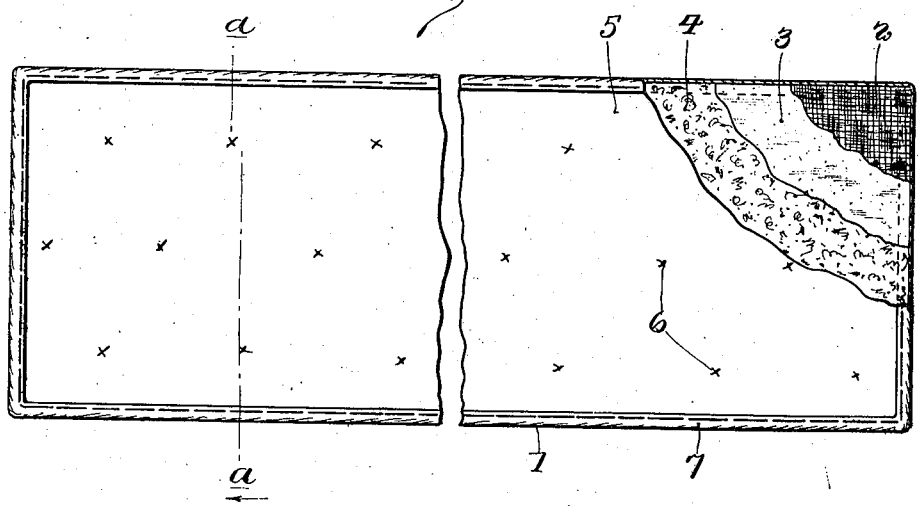
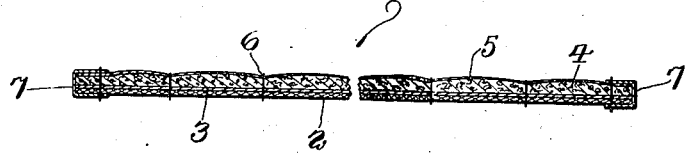
Inventor
Jacob E. Conner
By Sturtevant & Mason
Attorneys
Witnesses:
Grace P. Brereton

UNITED STATES PATENT OFFICE.

JACOB ELON CONNER, OF NEW BRIGHTON, NEW YORK.

OUTDOOR RUG.

1,237,243.  Specification of Letters Patent.  Patented Aug. 14, 1917.

Application filed March 24, 1917. Serial No. 157,167.

*To all whom it may concern:*

Be it known that I, JACOB E. CONNER, a citizen of the United States, residing at New Brighton, in the county of Richmond, State of New York, have invented certain new and useful Improvements in Outdoor Rugs, of which the following is a description, reference being had to the accompanying drawing and to the figures of reference marked thereon.

The invention relates to new and useful improvements in out-door rugs, such as used for picnic excursions, lawn-pallets, automobile accessories, tourist commodities, and the like.

An object of the invention is to provide an out-door rug which shall be impervious and protect the user from the moisture of the ground, which will be preferably indifferent to grass stains, and which will be soft, light and pliable, so that when not in use it may be rolled into small compass for convenience in carrying.

In the drawings, which show by way of illustration one embodiment of the invention:—

Figure 1 is a perspective view showing my improved out-door rug rolled for convenience in carrying;

Fig. 2 is a plan view of the same with portions broken away to show the interior structure; and Fig. 3 is a section on the line *a—a* of Fig. 2.

It is essential that an out-door rug shall be indifferent to grass stains, uninjured by the roughness and the moisture of the ground, which out-door rug shall also be soft and comfortable to the user, as well as protecting the user from the moisture of the ground. It is further essential that the rug shall be pliable and readily rolled into small compass for convenience in carrying.

To this end I have provided an out-door rug which consists of a backing or supporting base formed of some pliable material which has sufficient body thereto to form a substantially smooth surface support for the user. On the top of this backing or supporting base is a membrane of impervious material which is designed to resist moisture and protect the padding from the moisture of the ground. On top of the impervious membrane is a padding which is covered by a suitable protecting fabric, and the four separate layers referred to are secured together in any suitable way, and preferably the edges are bound throughout with a good strong binding.

Referring more in detail to the drawings:—

My improved out-door rug is indicated at 1 in the drawings. The backing or supporting base, indicated at 2, is formed of a material which is pliable and which is not injured by moisture and is also indifferent to grass stains. I have found that reeds, rushes, grasses, fiber, ratan, split bamboo, and similar materials may be used for this purpose. These materials resist moisture and these are not in any way injured by moisture. These materials are also indifferent to grass stains. The reeds, grasses, or the like are joined together in a well-known way to form a fabric, and this fabric is cut to a suitable shape for forming the backing or supporting base of the rug.

On top of this backing or supporting base 2 is placed a membrane 3 which is preferably made of waterproof silk. This constitutes a very light material which is impervious to moisture. On top of the membrane 3, I place a pad 4 of cotton, kapok or the like, and on top of the padding is a fabric 5 which serves as a covering for the pad. These four layers are secured together by tying stitches, indicated at 6, or other suitable securing devices, and the edges are bound by a binding, indicated at 7, which may be made of gimp or other strong material.

Attached to the backing or supporting base 1 are straps 8—8, and also joined to the supporting base or backing is a handle 9. The reeds, rushes or the like forming the backing extend transversely across the rug which permits the rug to be readily rolled, as indicated in Fig. 1, for convenience in carrying. After the rug has thus been rolled, it is secured by the straps 8—8, and the handle 9 serves as a carrying means. When the rug is unrolled, it may be laid on the ground or, if desired, it may be placed in a chair, the handle being caught over the top of the chair for supporting the same. It will thus be seen that I have provided a rug which may be rolled into small compass for carrying or which may be unrolled and placed on the ground or other suitable place. The rug makes a very soft surface which is also smooth and free from dampness.

It is obvious that minor changes in the details of construction and the arrangement of parts may be made without departing from the spirit of this invention, as set forth in the appended claims.

Having thus described the invention, what is claimed as new is:—

1. An out-door rug comprising a backing or supporting base, an impervious membrane extending throughout the limits of the backing, a padding on top of said membrane, a protecting fabric on top of said padding, and means for joining the same together.

2. An out-door rug comprising a backing formed of connected reeds extending transversely of the rug, a waterproof silk membrane extending throughout the limits of the backing and on top of the same, a cotton padding extending throughout the limits of the backing, a fabric covering the cotton padding, a gimp binding for binding the edges of the rug and joining the sections thereof together.

3. An out-door rug comprising a backing formed of connected reeds extending transversely of the rug, a waterproof silk membrane extending throughout the limits of the backing and on top of the same, a cotton padding extending throughout the limits of the backing, a fabric covering the cotton padding, a gimp binding for binding the edges of the rug and joining the sections thereof together, straps secured to the backing for securing the same when rolled, and a handle secured to said backing for carrying the same.

In testimony whereof, I affix my signature.

JACOB ELON CONNER.